United States Patent [19]
Heinitz et al.

[11] Patent Number: 6,035,827
[45] Date of Patent: Mar. 14, 2000

[54] METHOD FOR CONTROLLING AN INTERNAL COMBUSTION ENGINE FOR COMPENSATING BOUNCING OSCILLATIONS

[75] Inventors: Dirk Heinitz, Schönhofen; Achim Przymusinski, Regensburg, both of Germany

[73] Assignee: Siemens Aktiengesellschaft, Munich, Germany

[21] Appl. No.: 09/207,122

[22] Filed: Dec. 7, 1998

[30] Foreign Application Priority Data

Dec. 5, 1997 [DE] Germany ............... 197 53 997

[51] Int. Cl.[7] ............... F02D 41/14
[52] U.S. Cl. ............... 123/436
[58] Field of Search ............... 123/436, 406.23, 123/406.24

[56] References Cited

U.S. PATENT DOCUMENTS

| | | | |
|---|---|---|---|
| 4,051,818 | 10/1977 | Volckers | 123/494 |
| 4,345,559 | 8/1982 | Kuttner et al. | 123/435 |
| 4,656,986 | 4/1987 | Kull et al. | 123/357 |
| 5,448,976 | 9/1995 | Treinies et al. | 123/419 |
| 5,560,336 | 10/1996 | Takahashi et al. | 123/406.24 |
| 5,669,354 | 9/1997 | Morris | 123/419 |

FOREIGN PATENT DOCUMENTS

| | | |
|---|---|---|
| 0 461 504 A2 | 12/1991 | European Pat. Off. . |
| 41 08 734 A1 | 9/1992 | Germany . |
| 195 37 787 A1 | 4/1997 | Germany . |

*Primary Examiner*—Willis R. Wolfe
*Assistant Examiner*—Hieu T. Vo
*Attorney, Agent, or Firm*—Herbert L. Lerner; Laurence A. Greenberg; Werner H. Stemer

[57] ABSTRACT

A transmission system includes an internal combustion engine, a vehicle drive train and a fuel supply. A method for controlling the internal combustion engine for preventing low frequency bouncing oscillations includes connecting a transmission element upstream of the transmission system. The transmission element has a transmission function inverse with respect to a transmission function of the transmission system. A selection of a time constant of the transmission element not only prevents the bouncing oscillations but also achieves a damping of load jolts.

4 Claims, 3 Drawing Sheets

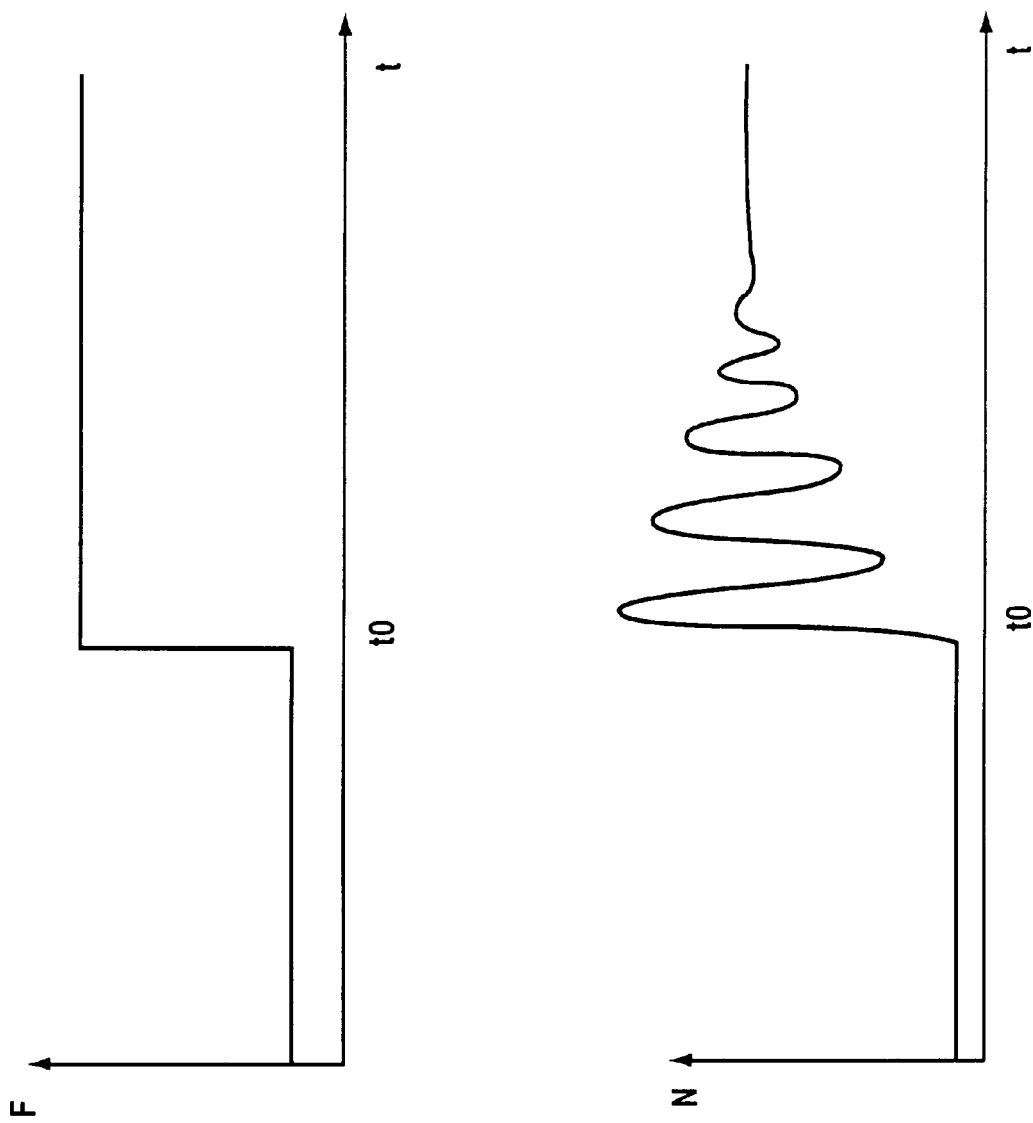

METHOD FOR CONTROLLING AN INTERNAL COMBUSTION ENGINE FOR COMPENSATING BOUNCING OSCILLATIONS

BACKGROUND OF THE INVENTION

Field of the Invention

The invention relates to a method for controlling an internal combustion engine which, in conjunction with a drive train of a vehicle, constitutes a transmission system that can be excited by changes in a fuel supply quantity to experience low frequency bouncing oscillations which are defined by a transmission function of the transmission system and are compensated by correction of a fuel supply using a transmission element.

In the case of interfering influences, the transmission system, which includes the internal combustion engine and the drive train of the vehicle, can be excited to experience oscillations which are damped to a greater or lesser degree. Interfering influences are, for example, a jump in the fuel quantity during the metering of fuel into the internal combustion engine or a jump in momentum caused externally, for example by a pothole in the pavement.

The oscillations which may become apparent through changes in the rotational speed usually lie in the range between 1 and 15 Hz and are referred to as bouncing or bouncing oscillations.

German Published, Non-Prosecuted Patent Application DE 195 37 787 A1 discloses a method for compensating bouncing oscillations. In that reference a signal expressing the wish of the driver is filtered through the use of a transmission element. The parameters of the transmission element, and thus its transmission behavior, are changed as a function of operating parameters while the internal combustion is operating. Furthermore, a subordinate rotational speed control is used for non-steady operation, which leads to a considerable number of application parameters.

SUMMARY OF THE INVENTION

It is accordingly an object of the invention to provide a method for controlling an internal combustion engine for compensating bouncing oscillations, which overcomes the hereinafore-mentioned disadvantages of the heretofore-known methods of this general type.

With the foregoing and other objects in view there is provided, in accordance with the invention, a method for controlling an internal combustion engine, which comprises providing a transmission system having a transmission function, a vehicle drive train and the internal combustion engine, the transmission system to be excited by changes in a fuel supply quantity to experience low frequency bouncing oscillations defined by the transmission function of the transmission system; providing a transmission element for compensating the bouncing oscillations by correcting a fuel supply, the transmission element having a transmission function being inverse of the transmission function of the transmission system and being a fractional rational function in a frequency representation; setting a numerator of the fractional rational function equal to a denominator of the transmission function of the transmission system; damping the bouncing oscillations by selecting a time constant and a damping in a numerator of the inverse transmission function; and damping load jolts by selecting a time constant and a damping in the denominator of the inverse transmission function.

According to the invention, a transmission element having a transmission function which is inverse with respect to the transmission function of the transmission system is connected upstream of the transmission system which has the fuel supply, the internal combustion engine and the drive train and is capable of oscillating.

In accordance with another mode of the invention, the transmission function of the transmission system which is capable of oscillating is described by a system of the second order with conjugate complex pole point. The inverse transmission function of the transmission element which is connected upstream in series is matched in terms of its time constant and damping parameters to the measured parameters of the transmission system including the fuel supply, the internal combustion engine and the drive train and is capable of oscillation. In this way, the pole points of the transmission system are compensated and the exciting of the oscillations is largely avoided. The upstream transmission element with the behavior which is inverse with respect to the transmission function of the transmission system avoids a situation in which the critical frequency range is excited.

In order to implement the fractional rational function of the transmission element, additional parameters are necessary in the denominator. It has surprisingly been found that these parameters can be used to implement damping of load jolts. Depending on the selection of parameters in the denominator of the fractional rational function, this damping of the load jolts assumes differing degrees, and does so with constant damping of the bouncing oscillations.

A further problem with bouncing oscillations is that when it is accelerating, the vehicle appears to behave differently from when it is decelerating. The cause thereof is the feeding back of the rotational speed during the calculation of the fuel quantity. Bouncing oscillations which have occurred are fed in again to the input of the transmission system through the use of a rotational speed dependent characteristic diagram. In accordance with a concomitant mode of the invention, in order to prevent that, a band filter which suppresses the frequency range of the bouncing oscillations is provided in the feedback branch in which the rotational speed is fed back to the characteristic diagram.

Other features which are considered as characteristic for the invention are set forth in the appended claims.

Although the invention is illustrated and described herein as embodied in a method for controlling an internal combustion engine for compensating bouncing oscillations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2a and 2b are graphs showing a profile of signal variables according to the prior art.

DESCRIPTION OF THE PREFERRED EMBODIMENTS

Figure 1:
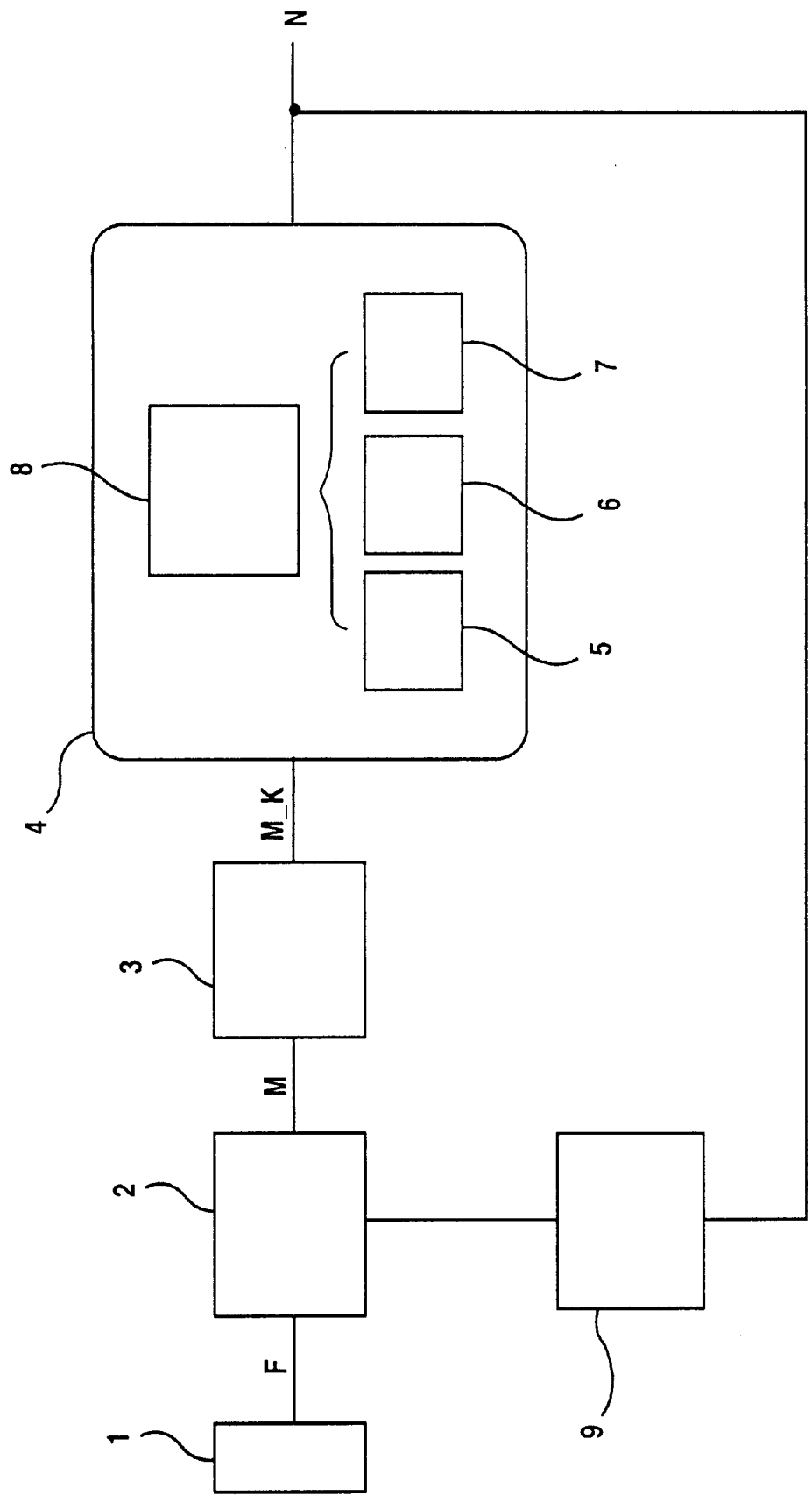
FIG. 1 is a block circuit diagram relating to an execution of a method for controlling an internal combustion engine.

Referring now to the figures of the drawings in detail and first, particularly, to FIG. 1 thereof, there is seen a block circuit diagram relating to an execution of a method for controlling an internal combustion engine. A gas pedal sensor 1 determines a driver's wish F from a gas pedal position. A fuel quantity M which is to be fed to the internal combustion engine is determined from this driver's wish F in a characteristic diagram 2 using other variables which describe the state of the internal combustion engine. This fuel quantity M is present at an output of the characteristic diagram 2 and is fed to a transmission element 3. The transmission element 3 modifies the fuel quantity M in accordance with its transmission function and makes a compensated fuel quantity signal M_K available at an output. The signal M_K is fed to a transmission system 4. The transmission system 4 includes a fuel supply 5, an internal combustion engine 6 and a drive train 7 of a vehicle and is described by a transmission function 8. The transmission function 8 indicates a time characteristic with which a rotational speed N output variable follows a fuel quantity input variable. The rotational speed N is fed back to the characteristic diagram 2 which determines the fuel quantity M from the driver's wish F. A band filter 9 which is disposed in this feedback branch is explained below.

The transmission system 4 which includes the fuel supply 5, the internal combustion engine 6 and the drive train 7 can, under specific external circumstances, be excited to experience low frequency oscillations. This oscillation property of the transmission system 4 is illustrated in FIGS. 2a and 2b. FIG. 2a shows a driver's wish F which changes suddenly to a higher value at a time t0. A response of the transmission system 4 is shown in FIG. 2b. The rotational speed N suddenly rises at the time t0 and carries out a damped oscillation until it stabilizes at an increased value. An analysis of this sudden response of the transmission system 4 shows that the transmission function 8 can be described by a system of a second order with conjugate complex pole point (PD2T2 element):

$$\text{Transmission function} = \frac{1}{p^2 T1 + 2pT1D1 + 1}$$

A time constant T1 and a damping D1 determine the transmission function 8 of the transmission system 4.

The oscillation of the rotational speed which is illustrated in FIG. 2b becomes apparent in the form of bouncing oscillations during driving. In order to carry out compensation, the transmission element 3 executes an inverse transmission function of the transmission system 4. This inverse transmission function is written as follows:

$$\text{Inverse transmission function} = \frac{p^2 T1 + 2pT1D1 + 1}{p^2 T2 + 2pT2D2 + 1}$$

As a result of the series connection of the transmission element 3 and the transmission system 4, pole points of the transmission function 8 are compensated and the exciting of the bouncing oscillations is largely avoided. The additional parameters in the denominator are necessary for the realization of a fractional rational function.

Figure 3A:
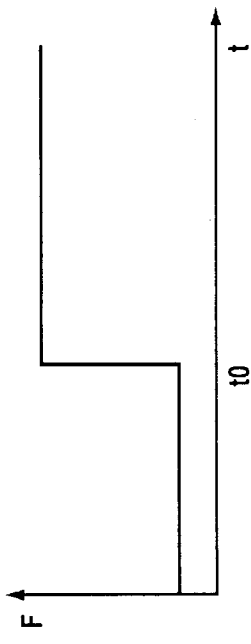
FIGS. 3a to 3f are graphs showing signal variables of the method according to the invention.
Figure 3B:
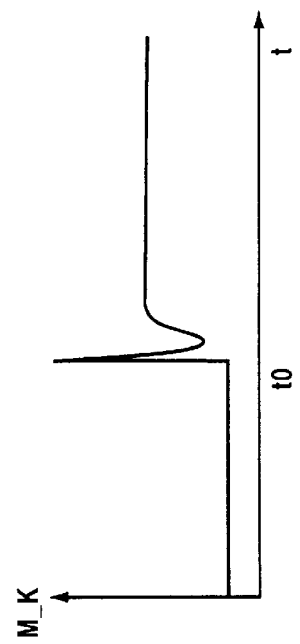
Figure 3C:
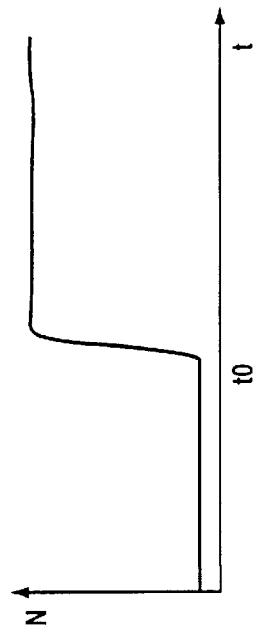
Figure 3D:
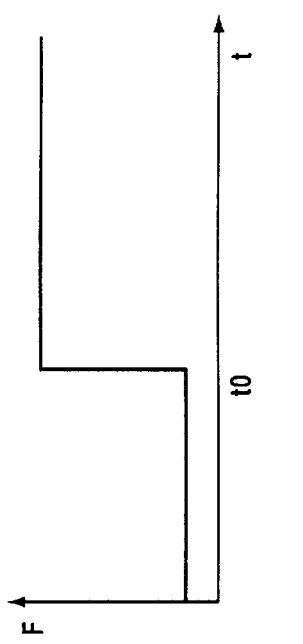
Figure 3E:
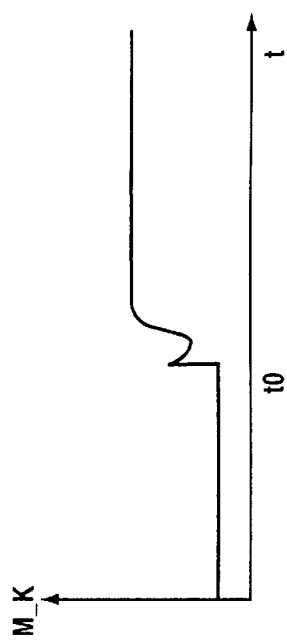
Figure 3F:
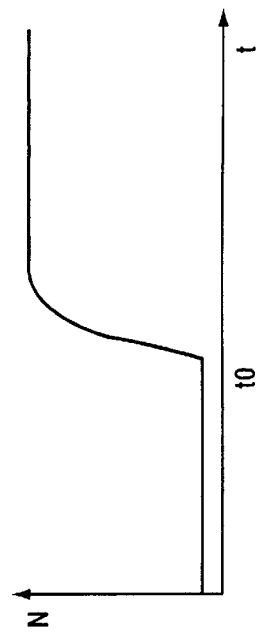

Surprisingly, it has been found that suitably selecting the parameters in the denominator causes the transmission element 3 to additionally carry out damping of load jolts. This function is determined through the use of the selection of a time constant T2. FIGS. 3a–3f show the influence of this time constant T2. FIG. 3a shows a sudden change in the driver's wish F to a higher value, again at the time t0. FIG. 3b shows a profile of the output signal M_K of the transmission element 3 and FIG. 3d shows the rotational speed profile of the transmission system 4. FIG. 3d shows the same profile of the driver's wish F as shown in FIG. 3a. FIG. 3e illustrates the output M_K of a transmission element 3 which has a larger time constant T2 than the transmission element in FIG. 3b. The result shown in FIG. 3f is found to be that the rotational speed N increases more slowly after the time t0, as a result of which a higher degree of damping of load jolts occurs. It is to be noted that identical damping of bouncing oscillations occurs independently of the selection of the time constant T2.

As mentioned above, FIG. 1 shows a band filter 9 connected into the branch into which the rotational speed N is fed back from the output of the transmission system 4 to the characteristic diagram 2. Since oscillations which have occurred are fed again to the transmission system 4 by the rotational speed-dependent characteristic diagram 2, the oscillation capability of the transmission system 4 would be increased without the band filter 9. For this reason, the band filter 9 filters out feedback in the frequency range of the bouncing oscillations and thus contributes to the suppression of the bouncing oscillations.

We claim:

1. In a method for controlling an internal combustion engine, the improvement which comprises:

providing a transmission system having a transmission function, a vehicle drive train and the internal combustion engine, the transmission system to be excited by changes in a fuel supply quantity to experience low frequency bouncing oscillations defined by the transmission function of the transmission system;

providing a transmission element for compensating the bouncing oscillations by correcting a fuel supply, the transmission element having a transmission function being inverse of the transmission function of the transmission system and being a fractional rational function in a frequency representation; setting a numerator of the fractional rational function equal to a denominator of the transmission function of the transmission system;

damping the bouncing oscillations by selecting a time constant and a damping in a numerator of the inverse transmission function; and damping load jolts by selecting a time constant and a damping in the denominator of the inverse transmission function.

2. The method according to claim 1, which comprises selecting the transmission function of the transmission system as a system of the second order with conjugate complex pole point.

3. The method according to claim 1, which comprises feeding back rotational speed to calculate the quantity of fuel to be supplied, and connecting a band filter in a feedback branch for suppressing a frequency range of the bouncing oscillations.

4. The method according to claim 1, which comprises feeding back rotational speed to calculate the quantity of fuel to be supplied, and connecting a low-pass filter in a feedback branch for suppressing a frequency range of the bouncing oscillations.

* * * * *